United States Patent [19]

Sung et al.

[11] Patent Number: 5,035,719

[45] Date of Patent: Jul. 30, 1991

[54] MIDDLE DISTILLATE CONTAINING STORAGE STABILITY ADDITIVE

[75] Inventors: Rodney L. Sung, Fishkill; Benjamin J. Kaufman, Hopewell Junction, both of N.Y.

[73] Assignee: Texaco Inc., White Plains, N.Y.

[21] Appl. No.: 291,084

[22] Filed: Dec. 27, 1988

[51] Int. Cl.$^5$ ............................................... C10L 5/00
[52] U.S. Cl. .................................... 44/334; 544/161
[58] Field of Search ............... 44/62, 63, 333, 334, 44/342; 544/161; 546/341; 525/301, 299; 548/572

[56] References Cited

U.S. PATENT DOCUMENTS

| | | |
|---|---|---|
| 3,033,662 | 5/1962 | Thompson et al. .................... 44/62 |
| 3,326,804 | 6/1967 | Hu ............................................ 44/62 |
| 3,462,249 | 8/1969 | Tunkel ..................................... 44/62 |
| 4,146,489 | 3/1979 | Stambaugh et al. .................... 44/62 |
| 4,160,739 | 7/1979 | Stambaugh et al. .................... 44/62 |
| 4,161,392 | 7/1979 | Cusano et al. .......................... 44/62 |
| 4,211,534 | 7/1980 | Feldman ................................. 44/62 |
| 4,533,361 | 8/1985 | Sung et al. .............................. 44/71 |
| 4,659,336 | 4/1987 | Sung et al. .............................. 44/63 |

*Primary Examiner*—Margaret B. Medley
*Attorney, Agent, or Firm*—Robert A. Kulason; James J. O'Loughlin; Carl G. Seutter

[57] ABSTRACT

Middle distillate fuels may be treated to improve storage stability by addition of, as additive, an acrylate polymer containing moieties derived from an N-heterocyclic amine such as 4-vinyl pyridine or the enamine ester of morpholine and propionaldehyde.

9 Claims, No Drawings

MIDDLE DISTILLATE CONTAINING STORAGE STABILITY ADDITIVE

FIELD OF THE INVENTION

This invention relates to middle distillate oils. More particularly it relate to additives which provide improved storage stability for middle distillate oils.

BACKGROUND OF THE INVENTION

As is well known to those skilled in the art, middle distillate fuels typified by diesel oil, Avjet fuel, fuel oils, kerosene, etc may be stored for extended periods of time under unfavorable conditions which are conducive to formation of solid deposits. These deposits, which are produced during storage at room temperature in the presence of air, accumulate on strainers, filters, screens etc. with which the oil comes into contact and ultimately plug the openings with resultant problems in operation.

The propensity of a system to form a deposit may be determined by ASTM Test D-2274 which provides indication of oxidative deterioration or stability cf a fuel. In the Potential Deposit (PDT) Test, comparable indications are obtained under more severe conditions. In this latter test a test specimen of oil is subjected to contact with air at elevated temperature; and after 2 hours, the turbidity of the specimen is determined on a scale of 1-4. A rating of 1 or 2 is satisfactory and a rating of 3 or 4 is unsatisfactory.

Background for the instant invention may be obtained from numerous patents including U.S. Pat. Nos. 4,548,724; 533,361; etc.

It is an object of this invention to provide an improved middle distillate fuel composition characterized by improved performance as determined by the Potential Deposit Test. Other objects will be apparent to those skilled in the art.

STATEMENT OF THE INVENTION

In accordance with certain of its aspects, this invention is directed to a liquid middle distillate fuel composition comprising a major portion of a liquid middle distillate hydrocarbon fuel and a minor effective stabilizing portion of, as additive, an acrylate polymer containing moieties derived from an N-heterocyclic amine.

DESCRIPTION OF THE INVENTION

The middle distillate fuels which may be employed in practice of the process of this invention may typically include those having a ibp of 300° F.–450° F., say 369° F.; a 50% bp of 400° F.–550° F., say 496° F.; a 90% bp of 475° F.–625° F., say 586° F.; an EP of 500° F.–650° F., say 627° F.; and an API Gravity of 25-45, say 37.3. These fuels may commonly be labelled as kerosene, fuel oil, diesel oil, D-1, or D-2. One middle distillate may be a diesel oil having the following properties:

TABLE

| Property | Value |
| --- | --- |
| API Gravity D-1298 | 37.3 |
| Kin. Vis. cSt @ 40° C. D-445 | 2.27 |
| Cetane D-163 | 49.6 |
| Distillation D-86 (°F.) | |
| IBP | 369 |
| 50% | 496 |
| 90% | 586 |
| EP | 627 |

Another charge may be a middle distillate fuel oil having the following typical characteristics:

TABLE

| Property | Value |
| --- | --- |
| API Gravity D-1298 | 43.0 |
| Kin. Vis cSt @ 40° C. D-445 | 1.57 |
| Cetane D-163 | 47 |
| Distillation D-86 (°F.) | |
| IBP | 344 |
| 50% | 429 |
| 90% | 490 |
| EP | 524 |

Another charge may be a No. 2 fuel oil having the following properties:

TABLE

| Property | Value |
| --- | --- |
| API Gravity D-1298 | 35.7 |
| Kin. Vis. cSt @ 40° C. D-445 | 2.40 |
| Cetane D-163 | 44.7 |
| Distillation D-86 (°F.) | |
| IBP | 388 |
| 50% | 510 |
| 90% | 596 |
| EP | 653 |

Another charge may be a kerosene having the following properties:

TABLE

| Property | Value |
| --- | --- |
| API Gravity D-1298 | 43.0 |
| Kin. Vis. cSt @ 40° C. D-445 | 1.57 |
| Cetane D-163 | 47 |
| Distillation D-86 (°F.) | |
| IBP | 344 |
| 50% | 429 |
| 90% | 490 |
| EP | 524 |

Another charge may be a diesel fuel having the following properties

TABLE

| Property | Value |
| --- | --- |
| API Gravity D-1298 | 32.8 |
| Kin. Vis. cSt @ 40° C. D-445 | 2.22 |
| Cetane D-163 | 42.2 |
| Distillation D-86 (°F.) | |
| IBP | 356 |
| 50% | 495 |
| 90% | 610 |
| EP | 640 |

It is a particular feature of this invention that it is possible to improve the properties of diesel fuel cut which is prepared by high temperature and pressure hydrogenation (as typified by that obtained as product from processes identified as "H-Oil" processes etc).

This standard Diesel Fuel cut from H-Oil which is particularly characterized by poor rating on the PDT may be typically characterized as follows:

TABLE

| Property | Value |
| --- | --- |
| Flash Point, °F. CM | 280 |
| Cloud Point, °F. | +5 |
| Pout Point, °F. | 0 |
| Kin. Vis. cS @ 40° F. | 4.3 |
| Cetane | 50.6 |
| FIA Analysis | |
| % Aromatics | 35.5 |
| % Olefins | 12.5 |
| % Saturates | 52.0 |
| S % | 0.41 |
| Con. Cu strip 3 hrs. 122° F. | 1 A |
| API Gravity | 31.4 |
| ASTM Distillation, °F. | |
| IBP | 540 |
| 10% | 556 |
| 30% | 561 |
| 50% | 566 |
| 70% | 572 |
| 90% | 582 |
| EP | 593 |

The additives which may be employed in practice of this invention include those containing an acrylate-derived backbone and which are particularly characterized by presence of an N-heterocyclic amines moiety. It is a feature of this invention that these additives may include:

(i) a polymer or copolymer of an acrylate, typified by copolymers of an acrylate and an N-heterocyclic amine.

(ii) a polymer or copolymer of an acrylate onto which is graft polymerized an N-heterocyclic amine containing a graft-polymerizable ethylenically unsaturated double bond (such as 4-vinyl pyridine or an enamine ester of morpholine);

(ii) a polymer or copolymer of an acrylate which has been functionalized by an N-heterocyrlic amine which contains a Zerewitinoff-active hydrogen atom which serves as a point of functionalization.

Typical acrylate monomers which may be homopolymerized or copolymerized to yield products suitable for use in practice of this invention may include:

TABLE

| methyl | acrylate |
| --- | --- |
| ethyl | acrylate |
| n-propyl | acrylate |
| lauryl | acrylate |
| stearyl | acrylate |
| methyl | methacrylate |
| ethyl | methacrylate |
| n-propyl | methacrylate |
| lauryl | methacrylate |
| stearyl | methacrylate |

Typical illustrative acrylate polymers which may be employed may have a molecular weight $\overline{M}_n$ of 10,000–1,000,000, say 120,000 and may preferably include polymers or copolymers of methyl methacrylate or ethyl acrylate.

Copolymers of acrylates may be employed typified by the following:

TABLE (i) Copolymer of $\overline{M}_n$ of 10,000 containing 25 w % of moieties derived from butyl methacrylate and 55 w % of moieties derived from lauryl methacrylate and 20 w % of moieties derived from Alfol 1620 SP brand of stearyl methacrylate;

(ii) Copolymer of $\overline{M}_n$ of 120,000 containing 35 w % of moieties derived from methyl methacrylate and 65 w % of moieties derived from butyl methacrylate.

(iii) Copolymer of $\overline{M}_n$ of 1,000,000 containing 30 w % of moieties from butyl methacrylate and 45 w % of moieties derived from Neodol 25 L brand of lauryl methacrylate and 25 w % of moieties derived from Alfol 1620 SP brand of stearyl methacrylate;

Neodol 25 L and Alfol 1620 SP are trademarks for technical grade mixtures of alkanols respectively of Shell Chemical Co. and Continental Oil Co. of the following typical analyses:

| Neodol 25 L (Synthetic Lauryl Alcohol) | Typical Approx. Homolog Distribution w % |
| --- | --- |
| Lighter than $C_{12}OH$ | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| Alfol 1620** (Synthetic Stearyl Alcohol) | |
| $C_{14}OH$ and lighter | 1 |
| $C_{16}OH$ | 55 |
| $C_{18}OH$ | 25 |
| $C_{20}OH$ | 9 |

In a preferred embodiment, there is copolymerized with the acrylate monomer, an N-heterocyclic amine containing a polymerizable ethylenically unsaturated double bond. Typical of such amines may be the following:

TABLE

N-vinyl pyridine
the enamine of morpholine and propionaldehyde
N-vinyl pyrrolidone
2-vinyl pyridine
4-vinyl pyridine
vinyl imidazole Typical of the copolymers containing such amines may be the following:

TABLE (i) Copolymer of $\overline{M}_n$ of 10,000 containing 3 w % of moieties derived from the enamine ester of propionaldehyde and morpholine and 24 w % of moieties derived from butyl methacrylate and 54 w % of moieties derived from lauryl methacrylate and 19 w % of moieties derived from Alfol 1620 SP brand of stearyl methacrylate.

(ii) Copolymer of $\overline{M}_n$ of 120,000 containing 3.5 w % of moieties derived from N-vinyl pyrrolidcne and 34 w % of moieties derived from methyl methacrylate and 62.5 w % of moieties derived from butyl methacrylate.

(iii) Copolymer $\overline{M}_n$ of 1,000,000 containing 2.5 w % of moieties derived from 4-vinyl pyridine and 29 w % of moieties derived from butyl methacrylate and 44w % of moieties derived from Neodol 25L brand of lauryl methacrylate and 24.5 w % of moieties derived from Alfol 1620 SP brand of stearyl methacrylate.

Polymers or copolymers of acrylates onto which are graft polymerized N-heterocyclic amines containing a graft polymerizable ethylenically unsaturated double bond may include the following:

TABLE (i) Copolymer of $\overline{M}_n$ of 10,000 containing 25 w % of moieties derived from butyl methacrylate and 55 w % of moieties derived from lauryl methacrylate and 19 w % of moieties derived from the Alfol 1620 brand of stearyl methacrylate onto which has been graft polymerized the enamine ester of propionaldehyde and morpholine in amount of one enamine moiety per units of molecular weight;

(ii) Copolymer of $\overline{M}_n$ of 120,000 containing 35 w % of moieties derived from methyl methacrylate and 65 w % of moieties derived from butyl methacrylate onto which has been graft polymerized N-vinyl pyrrolidone in anount of one pyrrolidone moiety per 75 units of molecule lar weight.

(iii) Copolymer of $\overline{M}_n$ of 1,000,000 containing 30 w % of moieties derived from the Alfol I620 SP brand of stearyl methacrylate and 45 w % derived from Neodol 25 L brand of lauryl methacrylate onto which has been graft polymerized N-vinyl pyridine in amount of one pyridine moiety per 550 units of molecular weight;

Although the amount of heterocyclic amine in the polymer may be varied depending upon the oil in which the product is to be used, typically the product will contain 0.01-0.2, say about 0.1 w % nitrogen which may correspond to the presence of one amine-derived moiety per 5-1000, preferably 5-600, say 500 units of molecular weight.

These polymers, graft copolymers, and functionalized polymers may be available commercially or they may be prepared by standard processes well known to those skilled in the art.

In practice of the process of this invention, the additive may be added to the middle distillate in amount of 0.0005-1 w %, preferably 0.005-0.1 w %, say 0.05 w % corresponding to 1.5-3000 PTB, preferably 15-300 PTB, say 150 PTB. (PTB is an abbreviation for pounds per thousand barrels). It is found that the thermal stability of the middle distillate fuels is improved substantially. A fuel which is unsatisfactorily rated 3 or 4 on the PDT may have this rating reduced to as little as 1-2 (which represents a satisfactory rating on the PDT) by adding small quantities (e.g. 150 PTB) of additive.

DESCRIPTION OF SPECIFIC EMBODIMENTS

Practice of this invention will be apparent to those skilled in the art from the following wherein all parts are by weight unless otherwise indicated. An asterisk (*) indicates a control example.

EXAMPLE I

In this Example which sets forth the best mode presently known of practicing this invention, the following are added to a reaction vessel:

TABLE

| Component | Grams |
|---|---|
| the enamine ester of morpholine and propionaldehyde | 6 |
| butyl methacrylate | 42 |
| Neodol 25 L brand of $C_{12}$-$C_{16}$ methacrylates | 115 |
| Alfol 1620 SP brand of $C_{14}$-$C_{20}$ methacrylates | 35 |
| 145 P Pale Turbine Stock | 67 |
| lauryl mercaptan | 0.06 |

The solution is purged with pure nitrogen for 20 minutes and then heated to 83° C. Azobisisobutyronitrile AIBN (0.4g) is then added and the mixture held at 83° C. for 3 hours. Additional AIBN (0.1 g) and I00 E Pale Oil (221 g) are added and the mixture is then heated to 100° C. and maintained at that temperature for one hour. The product copolymer ($\overline{M}_n$ of 120,000) contains moieties derived from enamine ester, butyl methacrylate, Neodol 25 L methacrylate, and from Alfol 1620 SP methacrylate. It contains 0.01 w %N and has one moiety derived from enamine ester per 500 units of molecular weight.

EXAMPLE II

In this Example, the procedure of Example I is duplicated except that 4-vinylpyridine (8 g) is used in place of the enamine ester of morpholine and acetaldehyde (6 g). The product contains moieties derived form 4-vinyl pyridine and from the methacrylates.

EXAMPLE III

In this Example, the procedure of Example I is duplicated except that 2-aminoethyl-2-xethyl imidazoline (6 g) is used in place of the enaminester of morpholine and propionaldehyde (6 g). The product contains moieties derived from 2-aminoethyl-2-methyl imidazoline and the methacrylates.

EXAMPLE IV*

In this control Example, the following are charged:

TABLE

| Component | Grams |
|---|---|
| Copolymer of ethylene-propylene of $\overline{M}_n$ of 120,000 and containing 58 w % derived from ethylene and 42 w % derived from propylene (as a 19.6 w % solution in 14.5 P Pale Turbine Oil) | 125 |
| Dicumyl peroxide (as a 25 w % solution in 145 P Pale Turbine Stock) | 6 |
| SNO-5 diluent oil | 166 |
| 2-aminoethyl-2-methyl imidazoline | 3 |

The solution of ethylene-propylene copolymer is charged to a resin flask which is then purged with nitrogen for twenty minutes and then heated to 155° C. The -aminoethyl-2-methyl imidazoline is added followed by a solution of dicumyl peroxide catalyst. The mixture is maintained at 160.C for 2 hours. After cooling to room temperature, the SNO-5 diluent oil is added.

Each of the products of Examples I-IV is added as a 15 w % solution in 145PPTS oil to a mixture containing 90 w % of standard D-2 diesel fuel and 10 w % of the standard diesel fuel cut from H-Oil (set forth supra) in amount of 150 PTB. The formulations are tested in the Potential Deposit Test as is a sample (Example V) which contains the diesel fuel cut from H-Oil without additive.

TABLE

| Example | Additive of Example | PDT Rating |
|---|---|---|
| VI | I | 2 |
| VII | II | 2 |
| VIII | III | 2 |
| IX* | IV* | 3 |
| X* | V* | 4+ |

From the above Table, it is apparent that the experimental Examples VI, VII, and VII of this invention, using the additives prepared in Example I, II and III, showed a PDT rating of 2 which is satisfactory. The oil without additive (Example X*) showed a rating of 4+which is unsatisfactory.

It is particularly surprising that the formulation of Example IX* (which contained the additive of Example IV*) received an unsatisfactory rating of 3. This indicates that the polymer backbone plays a significant part in the function of the additive. The ethylene-propylene copolymer of Example IV* (and IX*) is unsatisfactory while the acrylate polymer backbone of Example VIII (and III) is satisfactory.

Results comparable to those attained in Example I and VI may be attained if the backbone polymer is prepared from the following:

TABLE

| Example | Monomer |
| --- | --- |
| XI | methyl methacrylate |
| XII | ethyl methacrylate |
| XIII | methyl acrylate |
| XIV | ethyl acrylate |
| XV | methyl methacrylate |
|  | laury methacrylate |
| XVI | ethyl acrylate |
|  | lauryl methacrylate |

Results comparable to those attained by Example I (and VI) may be attained if the amine component is:

TABLE

| Example | Amine Component |
| --- | --- |
| XVII | N-vinyl pyridine |
| XVIII | N-vinyl pyrrolidone |
| XIX | 2-vinyl pyridine |
| XX | 4-vinyl pyridine |
| XXI | vinyl imidazole |

Although this invention has been illustrated by reference to specific embodiments, it will be apparent to those skilled in the art that various charges and modifications may be made which clearly fall within the scope of the invention.

We claim:

1. A liquid middle distillate fuel composition comprising a major portion of a liquid middle distillate hydrocarbon fuel selected from the group consisting of kerosene, fuel oil, diesel oil, and Avjet fuel and a minor effective stabilizing portion of an additive consisting essentially of an acrylate polymer containing moieties derived from an N-heterocyclic amine.

2. A liquid middle distillate fuel composition as claimed in claim wherein said middle distillate is a fuel diesel fuel derived from H-oil.

3. A liquid middle distillate fuel composition as claimed in claim 1 wherein said polymer is an acrylate homopolymer containing moieties derived from an N-heterocyclic amine.

4. A liquid middle distillate fuel composition as claimed in claim 1 wherein said polymer is an acrylate copolymer.

5. A liquid middle distillate fuel composition as claimed in claim 1 wherein said polymer is a methacrylate copolymer.

6. A liquid middle distillate fuel composition as claimed in claim 1 wherein said polymer is a copolymer containing moieties derived from butyl methacrylate and stearyl methacrylate.

7. A liquid middle distillate fuel composition as claimed in claim 1 wherein said amine is an enamine ester of morpholine and propionaldehyde.

8. A liquid middle distillate fuel composition as claimed in claim 1 wherein said additive is a polymer or copolymer of an acrylate which contains moieties derived from the enamine ester of morpholine and propionaldehyde.

9. A liquid middle distillate fuel composition comprising a major portion of a liquid diesel fuel derived from H-oil and a minor effective stabilizing portion of, as additive, an acrylate polymer containing moieties derived from the enamine ester of morpholine and propionaldehyde.

* * * * *